United States Patent Office 3,262,732
Patented July 26, 1966

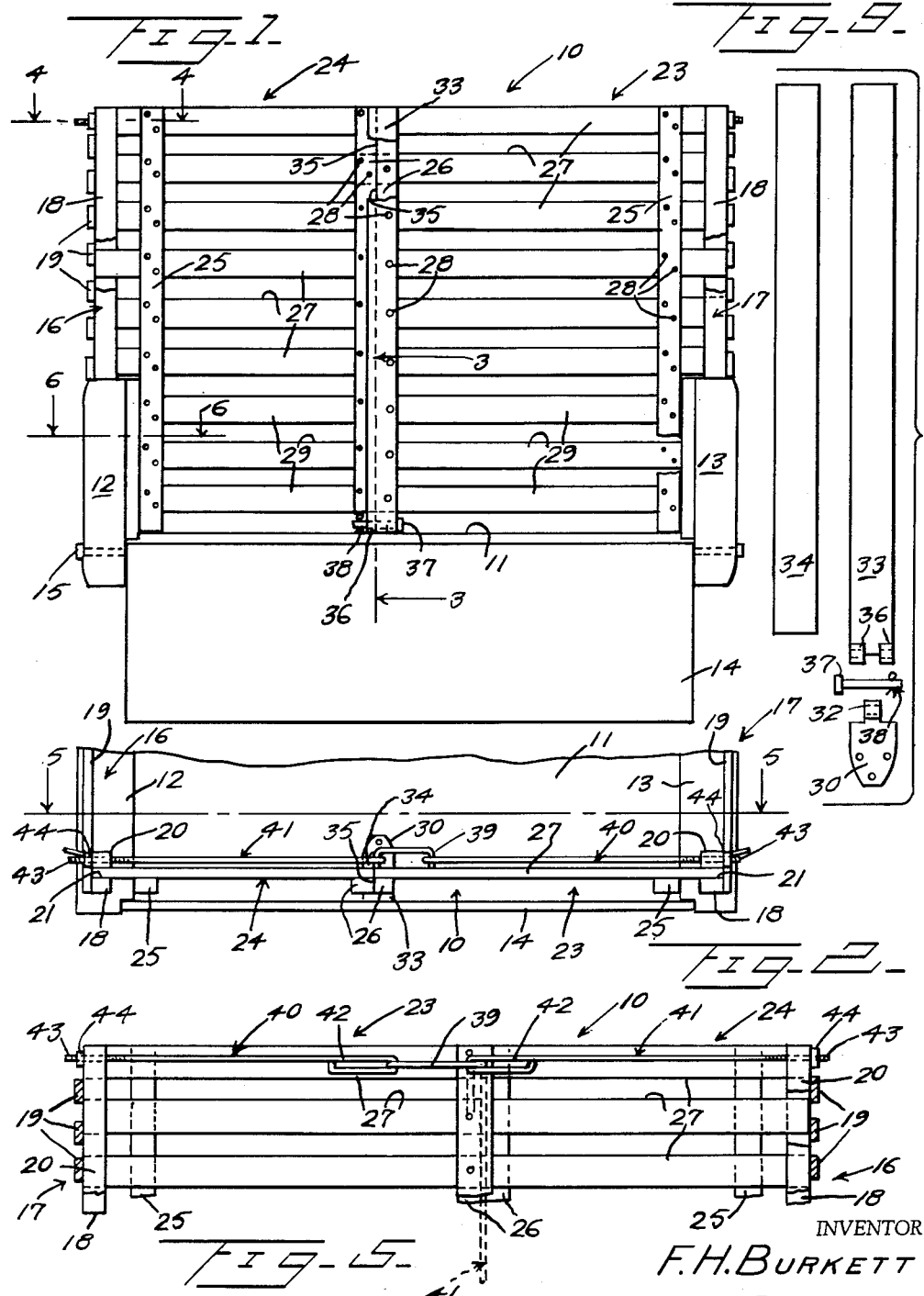

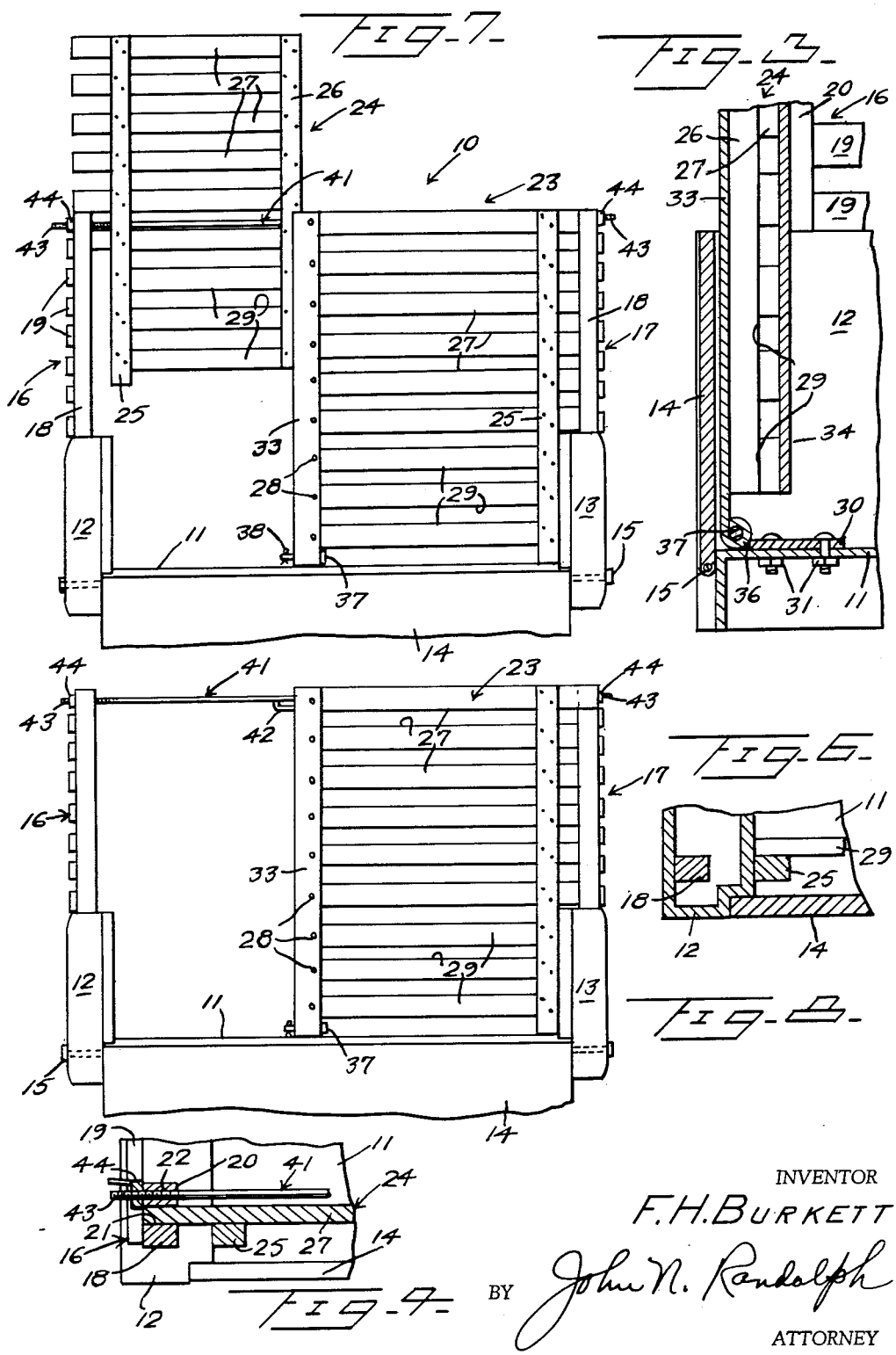

3,262,732
STOCK RACK TAIL GATE
Ferdinand H. Burkett, Kutch, Colo.
Filed Apr. 10, 1964, Ser. No. 358,881
5 Claims. (Cl. 296—52)

This invention relates to a novel tail gate for a stock rack of a pick-up truck and more particularly to a tail gate composed of sections, one of which may be readily moved between a closed position and an opened position to facilitate loading animals and unloading animals from the truck through a loading chute without risk of the animals escaping during the loading or unloading operation.

More particularly, it is an object of the present invention to provide a tail gate especially adapted for use with a stock rack of a wide bed pick-up truck and which includes a narrow tail gate section which may be readily raised and retained in a partially open position to facilitate loading and unloading small animals.

A further object of the invention is to provide a tail gate which will not interfere with the closing of the conventional tail gate of the pick-up truck, and which can be readily removed completely from the truck, when the truck is to be utilized for hauling loads other than livestock.

Various other objects and advantages of the invention will hereinafter become more fully apparent from the following description of the drawings, illustrating a presently preferred embodiment thereof, and wherein:

FIGURE 1 is an elevational view, partly broken away, looking toward the outer side of the tail gate, and showing the stock rack tail gate in a fully closed position and the pick-up truck tail gate in an open position;

FIGURE 2 is a top plan view thereof but showing the pick-up truck tail gate closed;

FIGURE 3 is an enlarged fragmentary vertical sectional view, taken substantially along a plane as indicated by the line 3—3 of FIGURE 1, but with the pick-up truck tail gate shown in a closed position;

FIGURE 4 is an enlarged fragmentary horizontal sectional view, taken substantially along a plane as indicated by a line 4—4 of FIGURE 1;

FIGURE 5 is an enlarged fragmentary transverse sectional view, taken substantially along a plane as indicated by a line 5—5 of FIGURE 2;

FIGURE 6 is an enlarged fragmentary horizontal sectional view, taken substantially along a plane as indicated by a line 6—6 of FIGURE 1, with the pick-up truck tail gate shown in a closed position;

FIGURE 7 is a view similar to FIGURE 1, showing a section of the top of the stock rack tail gate partially raised for loading and unloading small animals;

FIGURE 8 is a view similar to FIGURES 1 and 7, showing a section of the top of the stock rack tail gate completely removed for loading larger animals, and FIGURE 9 is an exploded plan or elevational view showing certain of the parts of the invention detached from one another.

Referring more specifically to the drawings, the stock rack tail gate in its entirety and comprising the invention is designated generally 10. The tail gate 10 is adapted for use with a stock rack of a conventional pick-up truck, a part of which has been illustrated in the drawings, including a portion of the truck bed, designated 11, portions of the two sides 12 and 13 of the pick-up truck body, and the pick-up truck tail gate 14. The pick-up truck tail gate 14 is hinged along its bottom edge by a hinge pin 15 which extends through the sides 12 and 13.

Only the rear portions of the two sides of the stock rack have been illustrated in the drawings since the stock rack, with one exception which will hereinafter be described, is of conventional construction. Each of the two corresponding sides 16 and 17 of the stock rack includes a plurality of uprights or posts 18. Only the rearmost post 18 of each stock rack side has been shown; and said posts engage in and extend upwardly from the two body sides 12 and 13. Each stock rack side 16 and 17 additionally includes a plurality of horizontally extending vertically spaced slats 19 which are disposed on the outer sides of and secured to each of the uprights or posts 18 of said sides. The stock rack additionally includes a conventional transverse front portion, not shown, which is constructed in the same manner as the sides 16 and 17 and which extends across the forward end of the truck body and between the forward ends of the sides 16 and 17. However, since only the rearmost portions of the two stock rack sides 16 and 17 actually function with the tail gate 10, only said rear portions have been shown. The rear portions of the stock rack sides 16 and 17 are modified to the extent that each side has a vertically extending cleat or upright 20, as best seen in FIGURES 2 and 4, and which is secured in any suitable manner to the inner sides of the slats 19 of said side, so as to extend from the top of the truck body side 12 or 13 upwardly to the level of the upper end of the rear post 18 of said stock rack side. The cleats or members 20 are spaced slightly from said rear uprights or corner posts 18 to combine therewith to form vertical grooves or channels 21; which grooves or channels 21 of the two stock rack sides open toward one another, as see in FIGURE 2. As seen in FIGURE 4, each cleat or upright 20 is provided near its upper end with a bore 22 which extends from the inner to the outer side thereof.

The tail gate 10 includes tail gate sections 23 and 24 each of which is composed of spaced upright members 25 and 26 and a plurality of horizontally extending vertically spaced upper slats 27, each of which is connected to each of the uprights 25 and 26 by suitable fastening means 28. In addition, each of the tail gate sections 23 and 24 includes several lower slats 29 which are also secured by the fastening means 28 to the uprights 25 and 26. All the slats 27 and 29 of each tail gate section extend only to but not beyond the upright 26 thereof and the slats 29 also extend to and not beyond the upright 25 of said tail gate section, while the slats 27 of both sections extend beyond the outer uprights 25 thereof.

With the stock gate 10 in a closed position, as seen in FIGURE 1, between the rear ends of truck sides 12 and 13 and the rear ends of the stock rack sides 16 and 17, the shorter bottom slats 29 are disposed between the truck sides 12 and 13 while the longer upper slats 27 extend beyond the two outer uprights 25 sufficiently to engage in the grooves or channels 21. The outer ends of the slats 27 of the gate section 24 engage the groove 21 of the stock rack side 16 and the outer ends of the slats 27 of the tail gate section 23 engage the groove 21 of the stock rack side 17, as clearly illustrated in FIGURE 2.

An anchor plate 30 is secured by fastenings 31 to the upper side of the rear portion of the truck bed 11 and is provided with a barrel or sleeve 32 at its rear end which is disposed crosswise of the truck bed. The inner uprights 26 of the two tail gate sections 23 and 24 are disposed at the adjacent vertical edges of said sections, so that the uprights 26 of the sections are disposed in abutting relation to one another. Section 23 is different from section 24 in that it includes two elongated plates 33 and 34 which are secured to the opposite sides of the inner vertical edge of the section 23, preferably by the fastening means 28, and which protrude from the upright 26 and the slats 27 and 29 of the section 23 toward the section 24, to form a channel 35 which opens toward the stock rack side 16 and in which the inner vertical side edge of the stock rack section 24 fits, as seen in FIGURES 1 and 2. The outer or rear plate 33 has transversely spaced barrels or sleeves 36 at its lower end which straddle the barrel 32 to receive a pin 37, for attaching the tail gate section 23 to the bed 11. A cotter pin 38 is applied through the pin 37 to retain the pin 37 in engagement with the barrels 32 and 36.

As best seen in FIGURES 2 and 5, a U-shaped rod has its ends anchored in the top slat 27 of the tail gate section 23 to provide an elongated loop 39 which is disposed on the inner side of said slat and longitudinally thereof, for attaching the tail gate section 23 to two rods 40 and 41. The rods 40 and 41 have elongated loops 42 at their adjacent ends for engaging the loop 39, and each of said rods has a threaded opposite end 43. The rods 40 and 41 may swing and slide relative to the loop 39 so that their threaded ends 43 may be positioned in alignment with and moved outwardly through the bores 22 of the uprights 20, as seen in FIGURES 2 and 4. The end 43 of the rod 41 extends through the bore of the upright 20 which is secured to the stock rack side 16, and the end 43 of the rod 40 extends outwardly through the bore of the other member 20 which is fastened to the stock rack side 17. Nuts 44 threadedly and detachably engage the threaded rod ends 43 and are tightened against the outer edges of the members 20 for pulling the stock rack sides 16 and 17 slightly toward one another to effectively clamp the outer edges of the tail gate sections 23 and 24, as defined by remote ends the slats 27, securely in the channels 21. Thus the tail gate 10, with the nuts 44 tightened, is held immovable relative to the stock rack sides 16 and 17 and is additionally held immovable relative to the truck bed 11 by the pin 37 engaging the barrels 32 and 36. The stock rack tail gate 10 is disposed forwardly of the extreme rear end of the bed 11, as seen in FIGURES 2 and 3, so that it will not interfere with closing of the truck tail gate 14.

Assuming that the tail gate 10 is completely closed and that the truck tail gate 14 is also in a raised and closed position, as seen in FIGURE 3, when it is desired to load or unload animals, the truck tail gate 14 is initially released and allowed to swing downwardly to its depending open position of FIGURE 1. The nut 44 engaging the rod 41 is then loosened so that the narrow tail gate section 24 can be slid upwardly in its channels 21 and 35. If the animals to be loaded or unloaded are small, the tail gate section 24 is raised to a partially open position, as seen in FIGURE 7, after which the nut 44 of rod 41 is again tightened for clamping the tail gate section 24 in its position of FIGURE 7, so that small animals can be loaded into or unloaded from the pick-up truck through a loading chute, not shown, having a width approximately the same as the width of the tail gate section 24.

However, if somewhat larger animals are to be loaded or unloaded, the tail gate section 24 is completely removed, as seen in FIGURE 8. If horses or similar tall animals are to be loaded or unloaded, in addition to removing the tail gate section 24, the nut 44 is disengaged from the rod 41 which in turn is disengaged from the upright 20 of the stock rack side 16, so that the rod 41 can assume a depending position as seen in dotted lines in FIGURE 5, thus completely opening a part of the stock rack tail gate 10 so that it will afford no obstruction to loading or unloading large animals.

By disconnecting both the nuts 44 and disengaging the rods 40 and 41 from the two uprights 20, the tail gate 10 is released from clamping engagement with the stock rack sides 16 and 17. After removal of the cotter pin 38, the pin 37 can be removed from the barrel portions 36 and 32 so that the tail gate 10 no longer will be fastened to the truck bed 11. The tail gate 10 can then be completely removed as a unit or by individual sections by upward displacement thereof for disengaging the slats 27 from the channels 21. The pick-up truck can then be utilized for hauling loads other than livestock, and the anchor plate 3, which remains attached to the truck bed 11, will not interfere with such use or with the loading or unloading of the truck.

Various modifications and changes are contemplated and may be resorted to without departing from the function or scope of the invention, as hereinafter defined by the appended claims.

I claim as my invention:

1. A stock rack tail gate for a pick-up truck adapted to fit into the rear end of a truck body and between rear end portions of stock rack sides which are mounted on and rise from sides of the truck body, said stock rack tail gate being composed of sections each extending from top to bottom thereof and each including a plurality of horizontally extending vertically spaced slats and a pair of spaced upright members to each of which each of the slats is secured, means adapted to be secured to the stock rack sides and combining with uprights thereof to form inwardly opening channels, certain of the slats of each of the tail gate sections having end portions engaging in said channels, one of said sections having a channel formed in a vertical inner edge thereof and in which an inner edge of the other section is slidably received, means detachably anchoring said first mentioned section to the truck bed, said last mentioned section being slidably movable in one of said first mentioned channels and said last mentioned channel relative to the first mentioned tail gate section for raising said other tail gate section to a partially open position or for completely removing said other tail gate section, and means connected to said first mentioned tail gate section and adapted to be adjustably connected to one of said stock rack sides for releasably clamping said other tail gate section immovably to said stock rack side and the first mentioned tail gate section in either a fully closed or partially open position.

2. A stock rack tail gate for a pick-up truck consisting of two tail gate sections spanning the space between the stock rack sides of a truck, means detachably anchoring one of said sections to the truck bed, means on a first one of the stock rack sides detachably interconnecting said tail gate section thereto, means slidably connecting one side edge of a second section of the stock rack tail gate to said first mentioned tail gate section, means on the other stock rack side slidably connecting the other side edge of said second section thereto for vertical movement of said second tail gate section between a fully closed position, a partially open raised position and a completely open position raised and removed from the first mentioned section and said other stock rack side, and means connected to the first mentioned tail gate section and said other stock rack side for releasably clamping said second tail gate section to the first mentioned tail gate section and to said other stock rack side for retaining said last mentioned tail gate section in a fully closed or partially open position.

3. A stock rack tail gate as in claim 2, each of said tail gate sections comprising a plurality of horizontally extending vertically spaced slats and at least two uprights to each of which each of the slats is secured.

4. A stock rack tail gate as in claim 2, said last mentioned tail gate section being of a width less than the width of the first mentioned tail gate section.

5. A stock rack tail gate for a truck comprising first and second tail gate sections spanning the space between the stock rack sides of a truck, means detachably anchoring the first section to the truck bed, means on a side edge of the first section slidably receiving a side edge of the second section, means on a stock rack side of the truck slidably receiving the other side edge of the second section for mounting the second section for vertical sliding movement relative to the first section in said second and last mentioned means, and means connected to the first section and said stock rack side for holding the second section in different vertically adjusted positions.

References Cited by the Examiner

UNITED STATES PATENTS

| | | | |
|---|---|---|---|
| 285,611 | 9/1883 | Grosshorn | 296—50 X |
| 859,754 | 7/1907 | Edelblnte | 296—52 |
| 1,191,569 | 7/1916 | Corbit | 296—51 |
| 1,632,747 | 6/1927 | Nash | 296—52 X |
| 2,555,288 | 5/1951 | Kruger | 296—50 X |

BENJAMIN HERSH, *Primary Examiner.*

P. GOODMAN, *Assistant Examiner.*